United States Patent
Kearney-Fischer

(10) Patent No.: US 11,948,468 B2
(45) Date of Patent: Apr. 2, 2024

(54) CONFLICT DETECTION AND AVOIDANCE FOR A ROBOT WITH RIGHT-OF-WAY RULE COMPLIANT MANEUVER SELECTION

(71) Applicant: AURORA FLIGHT SCIENCES CORPORATION, Manassas, VA (US)

(72) Inventor: Martin Kearney-Fischer, Boston, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 189 days.

(21) Appl. No.: 17/305,284

(22) Filed: Jul. 2, 2021

(65) Prior Publication Data

US 2023/0005378 A1    Jan. 5, 2023

(51) Int. Cl.
G08G 5/00 (2006.01)
G05B 13/02 (2006.01)
G05D 1/00 (2006.01)
G08G 5/04 (2006.01)

(52) U.S. Cl.
CPC ........... *G08G 5/045* (2013.01); *G05B 13/026* (2013.01); *G05D 1/0011* (2013.01); *G05D 1/101* (2013.01); *G08G 5/0069* (2013.01)

(58) Field of Classification Search
CPC .... G08G 5/045; G08G 5/0069; B64C 39/024; G05B 13/026; G05D 1/0011; G05D 1/101; B64U 2201/20; B64U 2201/10; B64U 10/13; B64U 2101/20; B64U 2101/30; B64U 2201/00; B64U 2201/102; B64U 30/20

See application file for complete search history.

(56) References Cited

U.S. PATENT DOCUMENTS

| | | | | |
|---|---|---|---|---|
| 10,656,643 | B1* | 5/2020 | Bertram | B64D 45/00 |
| 2002/0152029 | A1* | 10/2002 | Sainthuile | G08G 5/045 |
| | | | | 701/4 |
| 2008/0040040 | A1 | 2/2008 | Goto et al. | |
| 2010/0256909 | A1* | 10/2010 | Duggan | G08G 5/045 |
| | | | | 701/301 |

(Continued)

OTHER PUBLICATIONS

14 CFR 91.113, Federal Aviation Administration, May 15, 2023, p. 1.*

(Continued)

*Primary Examiner* — Truc M Do
(74) *Attorney, Agent, or Firm* — Quinn IP Law

(57) ABSTRACT

A method is provided for detecting and avoiding conflict along a current route of a robot. The method includes accessing or determining trajectories of the robot and a nearby moving object forward in time from their respective current positions, and detecting a conflict from a comparison of the trajectories. The method includes selecting a maneuver to avoid the conflict, and outputting an indication of the maneuver for use in at least one of guidance, navigation or control of the robot to avoid the conflict. Selection of the maneuver includes determining a plurality of angles that describe the conflict such as those at which the robot and moving object observe one another, and/or an angle between their trajectories, and evaluating the plurality of angles to select the maneuver.

26 Claims, 7 Drawing Sheets

(56) References Cited

U.S. PATENT DOCUMENTS

| | | | |
|---|---|---|---|
| 2010/0292871 A1* | 11/2010 | Schultz | G08G 5/045 |
| | | | 342/29 |
| 2014/0249738 A1 | 9/2014 | Euteneuer et al. | |
| 2016/0275801 A1* | 9/2016 | Kopardekar | G08G 5/0082 |
| 2017/0069214 A1* | 3/2017 | Dupray | G08G 5/0008 |
| 2020/0320888 A1* | 10/2020 | Hall | G08G 5/0078 |
| 2021/0118303 A1 | 4/2021 | Chan | |

OTHER PUBLICATIONS

Hwang et al., "Protocol-Based Conflict Resolution for Air Traffic Control", Stanford University, Stanford, CA, Jul. 2002, 49 pages.
Alturbeh et al., "Visual Flight Rules-Based Collision Avoidance Systems for UAV Flying in Civil Aerospace", Robotics, retrieved from www.mdpi.com/journal/robotics, Dec. 2019, 35 pages.
United States, Federal Aviation Administration, Federal Aviation Regulations, Part 91, Department of Transportation, Washington, D.C., 1989, pp. 707-708.

* cited by examiner

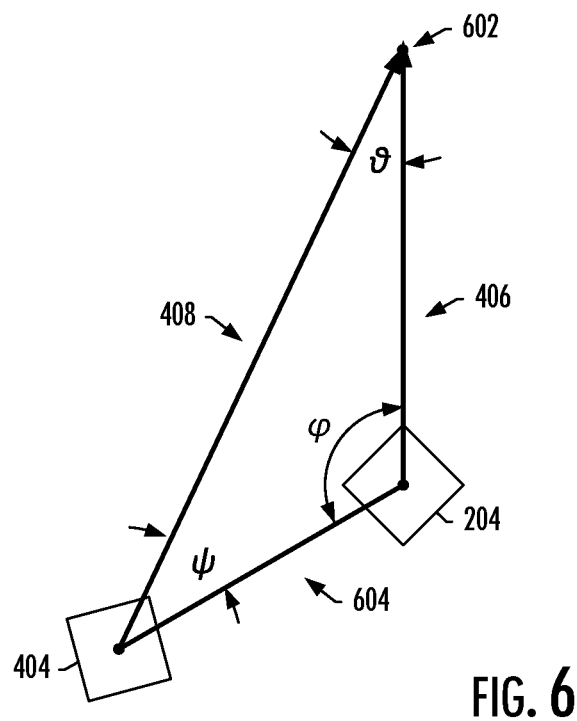
FIG. 6
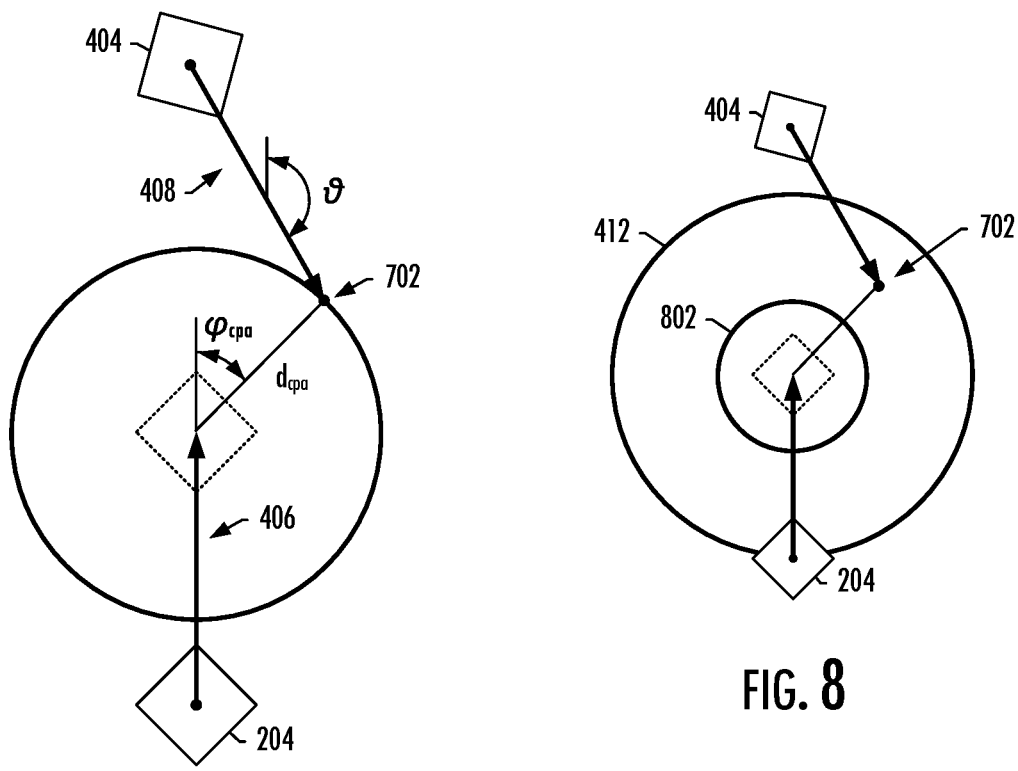
FIG. 7
FIG. 8

CONFLICT DETECTION AND AVOIDANCE FOR A ROBOT WITH RIGHT-OF-WAY RULE COMPLIANT MANEUVER SELECTION

TECHNOLOGICAL FIELD

The present disclosure relates generally to robotics and, in particular, to one or more of the design, construction, operation or use of autonomous robots such as autonomous or semi-autonomous vehicles.

BACKGROUND

Many modern robots and other machines are designed to operate with increased autonomy and are less reliant on weld-trained operators to safely operate. Some of these modern robots are manned while others are unmanned, in particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of autonomy, which often includes multiple aspects of robot operation. These aspects of robot operation include automatic control of a given robot to support remote human control. Another aspect is optimization systems (and associated methods) to determine how, for a given robot or set of robots, tasks should be ordered and/or allocated. And yet another aspect of robot operation is automatic, real-time or near real-time data processing, and exploitation in support of automatic route planning, mission execution and other activities.

Despite advancements, existing autonomy systems are typically configured to address only one aspect of these activities, thereby focusing its design of the underling autonomy algorithms and software architecture on a narrow mission set. This limits the extensibility of existing autonomy systems. Furthermore, it is generally desirable to improve existing systems to enhance their efficiency and operation.

Therefore it would be desirable to have a system and method that takes into account at least some of the issues discussed above, as well as other possible issues.

BRIEF SUMMARY

Example implementations of the present disclosure are directed to conflict detection and avoidance along a current route of a robot. Some example implementations use an algorithm of conditional statements to select a maneuver to avoid a conflict, in a manner that complies with applicable right-of-way rules and minimizes confusion by other traffic in the robot's environment. In the context of an aerial vehicle subject to rules and constraints defined by an appropriate air navigation service provider such as the Federal Aviation Administration in the United States, these right-of-way rules may be the same as or similar to those expressed in 14 C.F.R. 91.113. In some cases of conflict between two aerial vehicles, the right-of-way rules may generally specify that the less capable one of the aerial vehicles has right-of-way. In some examples in which one of the aerial vehicles is a small unmanned aerial vehicle, the right-of-way rules may specify that the small unmanned aerial vehicle yields the right of way to other aerial vehicles.

The present disclosure thus includes, without limitation, the following example implementations.

Some example implementations provide an apparatus for detecting and avoiding conflict along a current route of a robot, the apparatus comprising: a memory configured to store computer-readable program code; and processing circuitry configured to access the memory, and execute the computer-readable program code to cause the apparatus to at least: access or determining trajectories of the robot and a nearby moving object forward in time from respective current positions of the robot and the nearby moving object; detect a conflict between the robot and the nearby moving object from a comparison of the trajectories; select a maneuver to avoid the conflict, including: determine a plurality of angles that describe the conflict, the plurality of angles including a first angle at which the robot observes the moving object, and either a second angle at which the moving object observes the robot, or a third angle between the trajectories at a crossing point of the trajectories; and evaluate the plurality of angles to select the maneuver to avoid the conflict; and output an indication of the maneuver for use in at least one of guidance, navigation or control of the robot to avoid the conflict.

Some example implementations provide a method of detecting and avoiding conflict along a current route of a robot, the method comprising: accessing or determining trajectories of the robot and a nearby moving object forward in time from respective current positions of the robot and the nearby moving object; detecting a conflict between the robot and the nearby moving object from a comparison of the trajectories; selecting a maneuver to avoid the conflict, including: determining a plurality of angles that describe the conflict, the plurality of angles including a first angle at which the robot observes the moving object, and either a second angle at which the moving object observes the robot, or a third angle between the trajectories at a crossing point of the trajectories; and evaluating the plurality of angles to select the maneuver to avoid the conflict; and outputting an indication of the maneuver for use in at least one of guidance, navigation or control of the robot to avoid the conflict.

Some example implementations provide a computer-readable storage medium for detecting and avoiding conflict along a current route of a robot, the computer-readable storage medium being non-transitory and having computer-readable program code stored therein that, in response to execution by processing circuitry, causes an apparatus to at least: access or determining trajectories of the robot and a nearby moving object forward in time from respective current positions of the robot and the nearby moving object; detect a conflict between the robot and the nearby moving object from a comparison of the trajectories; select a maneuver to avoid the conflict, including: determine a plurality of angles that describe the conflict, the plurality of angles including a first angle at which the robot observes the moving object, and either a second angle at which the moving object observes the robot, or a third angle between the trajectories at a crossing point of the trajectories; and evaluate the plurality of angles to select the maneuver to avoid the conflict; and output an indication of the maneuver for use in at least one of guidance, navigation or control of the robot to avoid the conflict.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
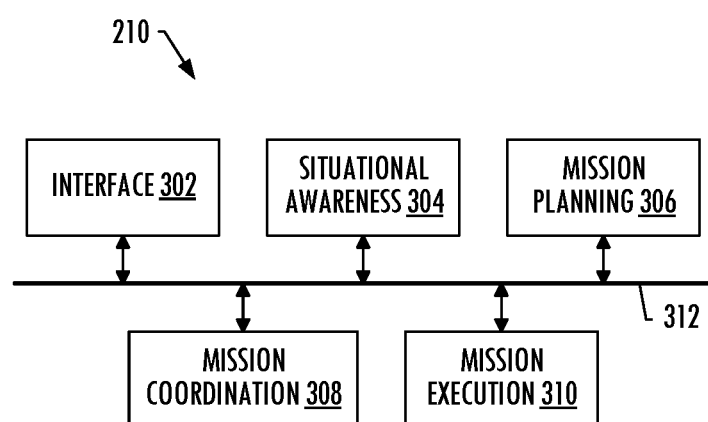
Figure 4:
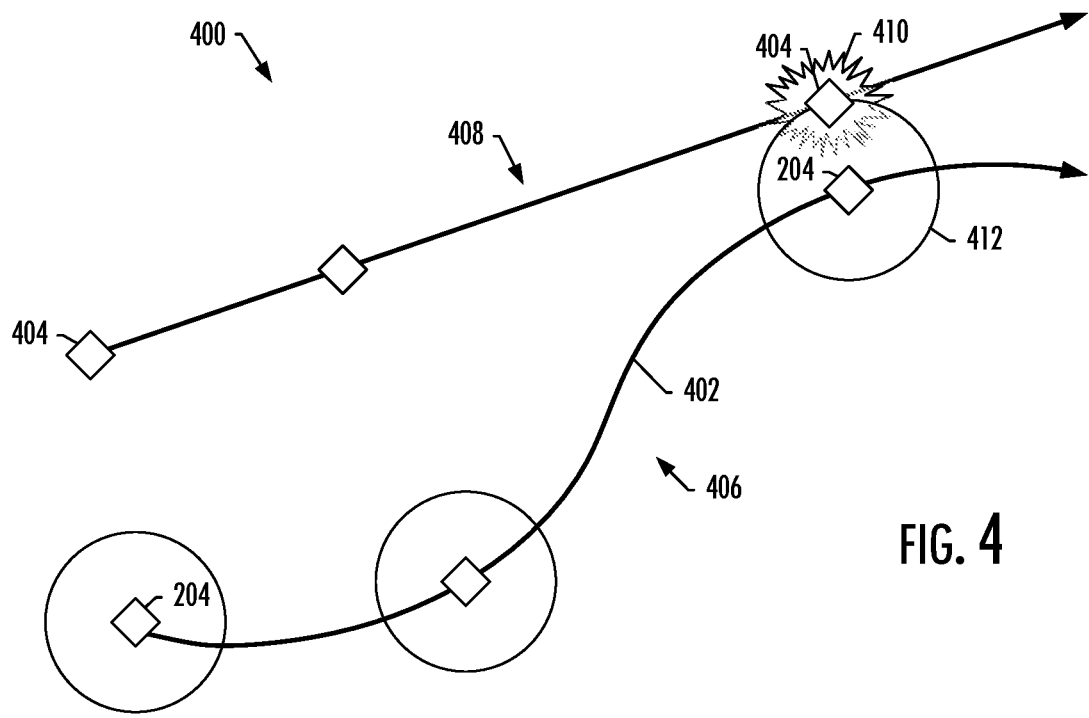
Figure 5:
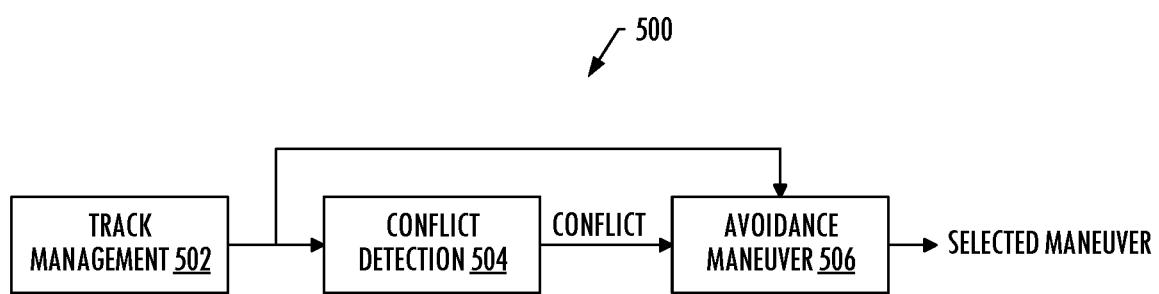
Figure 9:
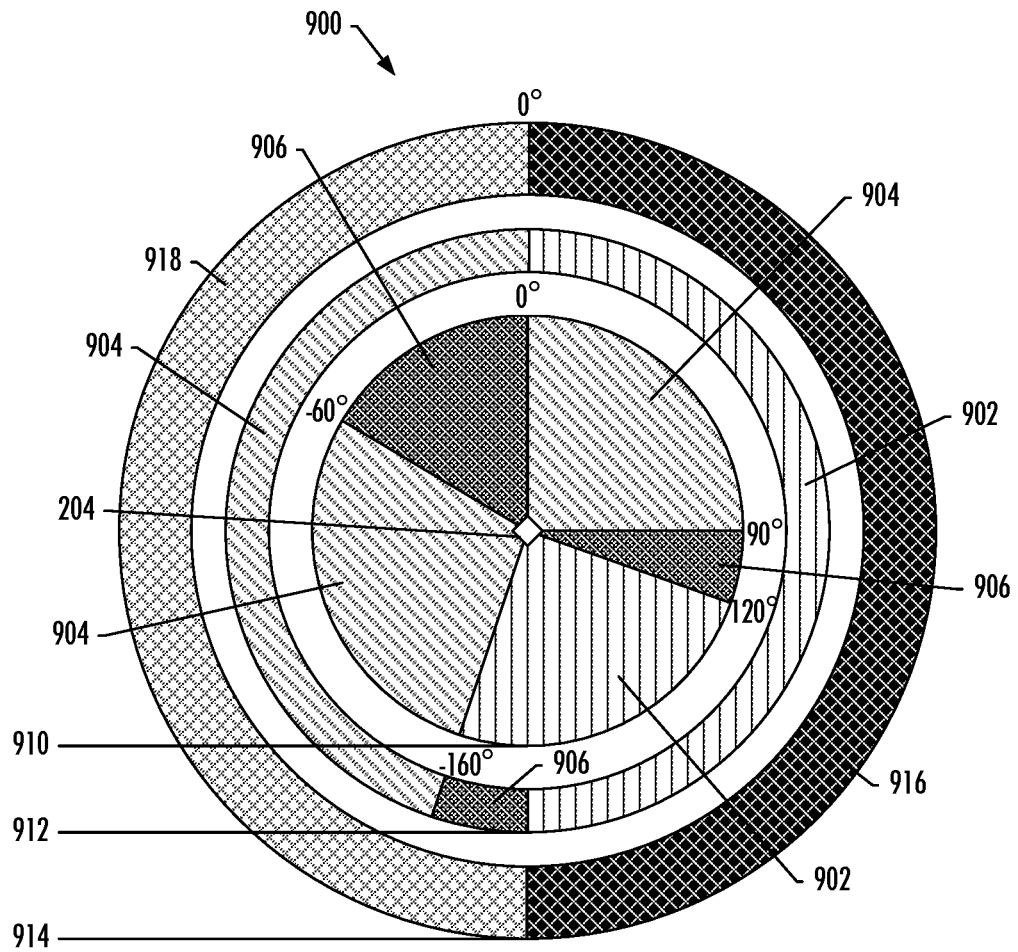
Figure 10:
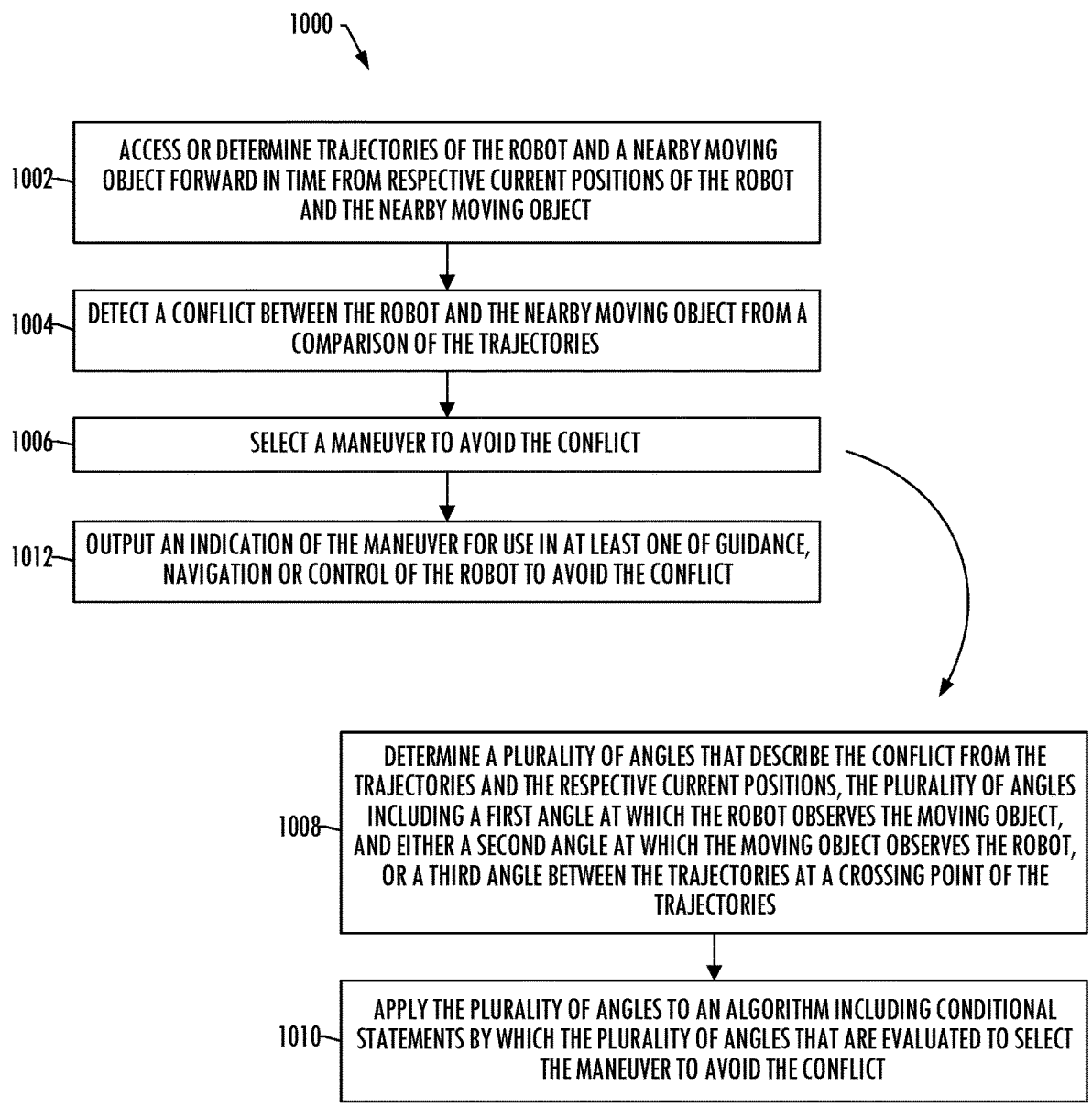
Figure 11:
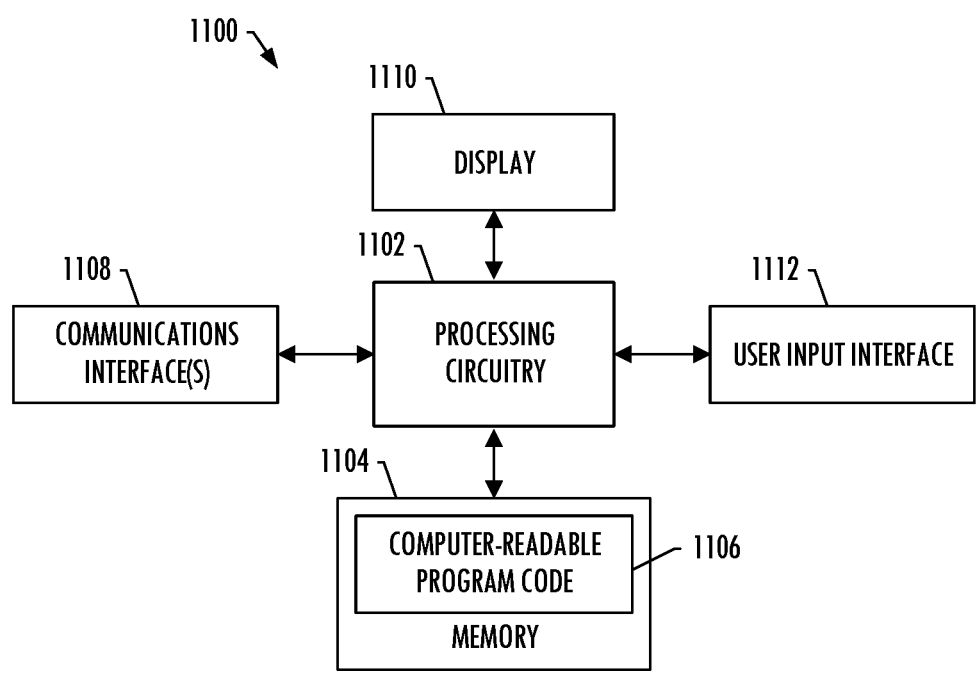

FIG. 3 more illustrates a mission management system (MMS) according to some example implementations;

FIG. 4 illustrates a scenario in which the robot is executing a mission in which the robot is to travel on a current route in an environment in which one or more moving objects are nearby the robot, according to some example implementations;

FIG. 5 is a diagram of services that may be implemented by the MMS for conflict detection and avoidance with respect to one or more nearby moving objects, according to some example implementations;

FIGS. 6 and 7 illustrate angles that may be determined to describe a conflict between a robot and a nearby moving object, according to various example implementations;

FIG. 8 illustrates distances from the robot from which a type of the conflict may be determined according to some example implementations;

FIG. 9 illustrates a region centered on the robot is divided into sectors in which a nearby moving object may be located to select a maneuver to avoid the conflict, according to some example implementations;

FIG. 10 is a flowchart illustrating various steps in a method of detecting and avoiding conflict along a current route of a robot, according to various example implementations; and FIG. 11 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot. A robot designed and configurable to operate with at least some level of autonomy may at times be referred to as an autonomous robot, or an autonomous aerial robot in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

Figure 1:
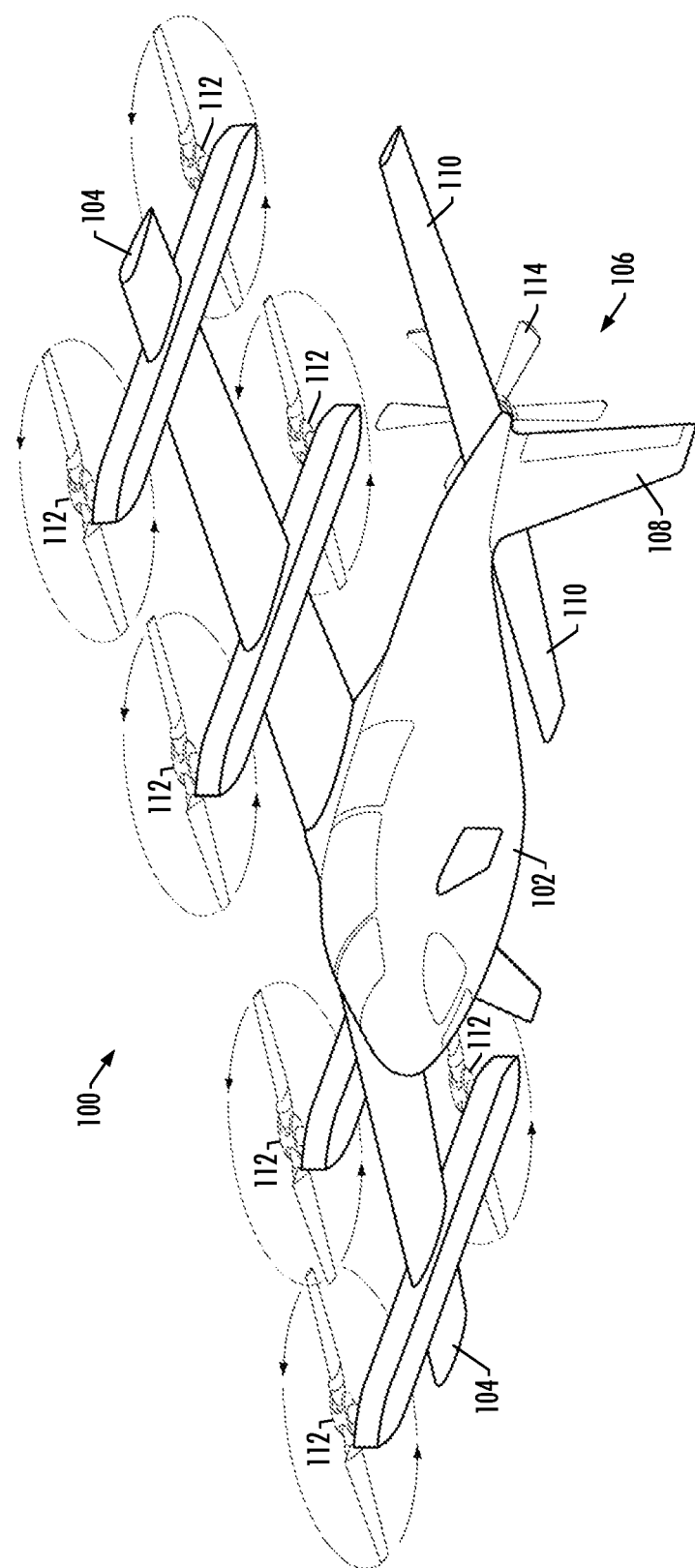
FIG. 1 illustrates one type of robot, namely, an unmanned aerial vehicle, that may benefit from example implementations of the present disclosure.

FIG. 1 illustrates one type of robot, namely, a UAV 100, that may benefit from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to respectively the wings and the end of the tail assembly for lifting and propelling the UAV during flight.

Figure 2:
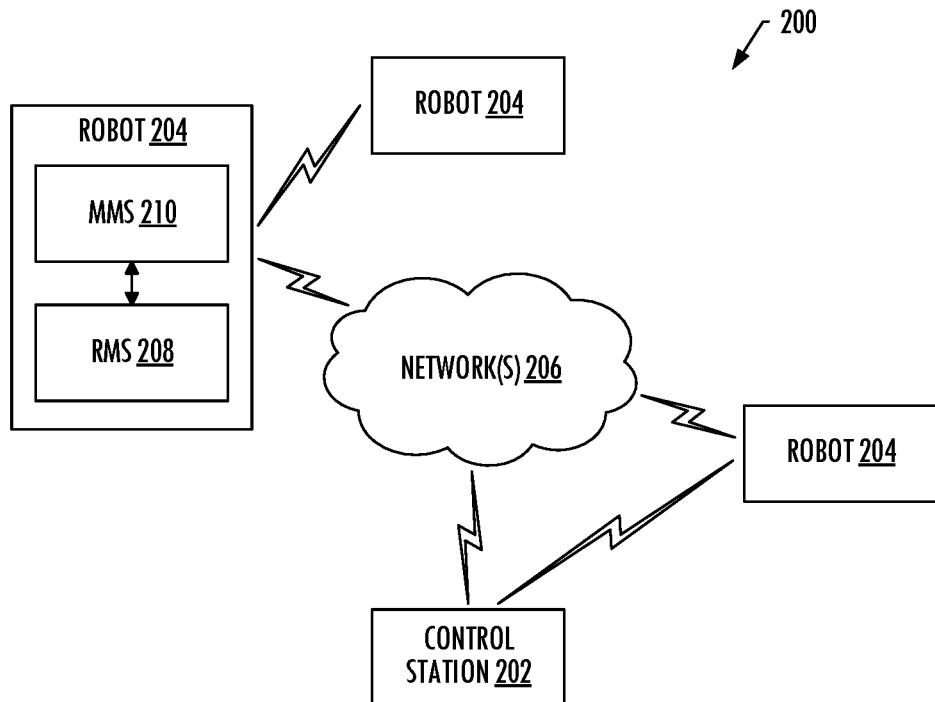
FIG. 2 illustrates a system according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more robots 204 (e.g., one or more UAVs 100). The control station provides facilities for communication with or control of the one or more robots, such as by wired or wireless data links directly or across one or more networks 206. In some examples, the control station may be a ground station, and not in all cases control the robots. In this regard, the control station may be configured to monitor the robots. The control station may initiate mission, but the control station may not control the robots to maneuver. At times, then, the control station may enable or provide a distributed network/server of software functions.

The robot 204 includes a robot management system (RMS) 208 and a mission management system (MMS) 210. The RMS is a robot-specific subsystem configured to manage subsystems and other components of the robot. These subsystems and other components include, for example, maneuver controls, landing gear, onboard environmental systems, electrical, pneumatic and hydraulic systems, communications systems, navigation systems and other subsystems and components for controlling operation and maneuvering of the robot. The RMS is configured to accept maneuver commands such as waypoints and/or steering commands, and control the robot to follow those maneuver commands. In the context of a vehicle, the RMS is at times referred to as a vehicle management system (VMS).

The MMS 210 is a subsystem configured to manage missions of the robot 204. A mission is a deployment of the robot (one or more robots) to achieve one or more mission objectives. A mission may be decomposed into maneuvers of the robot with optional sensor and/or effector scheduling, and the MMS may execute tasks to manage the robot to execute maneuvers with specific parameters and capabilities. The MMS 210 includes subsystems to process sensor data to situational awareness, plan tasks for the robot 204 (or multiple robots), coordinate with teams to assign tasks, execute assigned tasks. The MMS is also configured to interface with the RMS 208, and in some examples the control station 202. Although the MMS is shown on the robot 204, the MMS may instead be at the control station; or in some examples, the MMS may be distributed between the robot and the control station.

In some examples, the MMS 210 provides a complete, end-to-end autonomy architecture with open system architecture standards and parameterized to allow rapid extension and reapplication to a variety of robots. The flexibility of the MMS enables an operator to code it once, but to apply it anywhere. The MMS may therefore be applied to virtually any robot that applies, or benefits from, autonomy. The MMS may include an adaptable autonomy architecture that is applicable to a variety of robots, including those identified above. A benefit of the MMS is therefore not only in the specific contents, but also in the specific details of the architecture, its subroutines, and in the interfaces between those subroutines and other systems/devices that support rapid extensibility and adaptability of the MMS to a variety of domains.

FIG. 3 more particularly illustrates the MMS 210 according to some example implementations of the present disclosure. The MMS may include any of a number of different subsystems (each an individual system) for performing one or more functions or operations. As shown, in some examples, the MMS includes an interface subsystem 302, a situational awareness subsystem 304, a mission planning subsystem 306, a mission coordination subsystem 308, and a mission execution subsystem 310. As suggested above, in some examples, the subsystems of the MMS may be on the robot 204, at the control station 202, or distributed between the robot and the control station. The subsystems may be configured to communicate with one another directly, over a communication bus 312, or across the network(s) 206 in examples in which the MMS is distributed between the robot and the control station.

The subsystems enable the MMS 210 of the robot 204 to interface with the system 200, perform situational awareness, plan a mission including a plurality of tasks, coordinate the plurality of tasks and thereby the mission with other robots 204, and execute the mission. For example, the MMS may use the interface subsystem 302 to interface with various sensors onboard the robot, the RMS 208, the control station 202 and/or other robots. The MMS may use the situational awareness subsystem 304 to acquire sensor data and maintain an awareness of the state of the environment in which the robot is operating. The MMS may use the mission planning subsystem 306 to plan a mission including or associated with a plurality of tasks, and which may incorporate rules of engagement, tactics and other constraints on operations. The MMS may likewise use the mission planning subsystem to dynamically replan a mission in which changes to the mission are made in real-time or near real-time as the mission is executed. The MMS may use the mission coordination subsystem 308 to coordinate the plurality of tasks of the mission with other robots and users, where agreed-upon tasks may then be executed by the MMS using the mission execution subsystem 310.

According to some example implementations of the present disclosure, the MMS 210 is also configured to implement software functionality or functionalities (at times referred to as services) during a mission to provide the robot 204 with conflict detection and avoidance capabilities. During a mission, the robot may take a path, and this path may be described by a series of waypoints that define a route the robot will travel. The robot travels with a velocity (speed and direction of motion), and the series of waypoints and velocities at that define the route with respect to time defines a trajectory of the robot (at times referred to as a track of the robot). The conflict detection and avoidance capabilities enable the robot to detect and avoid conflicts along its route of travel.

FIG. 4 illustrates a scenario 400 in which the robot 204 is executing a mission in which the robot is to travel on a current route 402 in an environment in which one or more moving objects 404 are nearby the robot. In some examples, these moving objects are other robots that may be of the same type or different types than the robot. Other examples of suitable moving objects include non-robot vehicles such as any of a number of different types of ground vehicles, watercraft, aircraft, spacecraft or the like.

FIG. 5 is a diagram of services 500 that may be implemented by the MMS 210 for conflict detection and avoidance with respect to nearby moving objects 404, according to some example implementations. As shown, the services may include a track management 502 service, conflict detection 504 service, and an avoidance maneuver selector 506 service. In some examples, the track management service may be implemented by the situational awareness subsystem 304 of the MIMS; and the conflict detection service and avoidance maneuver selector service may be implemented by the mission execution subsystem 310 of the MMS.

Referring back to FIG. 4, the track management 502 service is configured to access or determine trajectories 406, 408 of the robot 204 and nearby moving object(s) 404 forward in time from respective current positions of the robot and the nearby moving object. In some examples, the track management 502 service is configured to determine the trajectory of the robot 204 on its current route 402, such as from data that indicates a position and a velocity of the robot. The data may include state data that describes position and velocity of the robot, and which in some examples may be received from the RMS 208. In some examples, the current route for the robot is described by a route command, a flight plan (for an aerial robot) and/or a mission route; and in some of these examples, the trajectory of the robot is determined using the route command, the flight plan and/or the mission route. In this regard, the route in some examples is a planned route of the robot.

In some examples, the track management 502 service is configured to determine the trajectory 408 of the nearby moving object 404, such as from data that indicates a position and a velocity of the nearby moving object. This data may be or include sensor data from any of a number of different sensors including those employing technologies such as acoustics, radio, optics and the like. More particular examples of suitable sensors include those employing radar, lidar, infrared sensors, cameras and the like. Another example of a suitable sensor in the context of an aerial robot is an automatic, dependent surveillance-broadcast (ADS-B) receiver configured to receive ADS-B signals.

The conflict detection 504 service of the services 500 that may be implemented by the MMS 210 is configured to detect a conflict 410 between the robot 204 and the nearby moving object 404 from a comparison of the trajectories 406, 408, such as from the track management 502 service. The conflict detection service is configured to output an indication of the conflict, which may include a time or distance to a point of approach between the nearby moving object and the robot. In some examples, the point of approach is the closest point of approach between the nearby moving object and the robot. The conflict may be detected in any of a number of different manners, such as when the nearby moving object is within a clear region 412 that includes the robot, and a time to the point of approach between nearby moving object and the robot is less than a time threshold value. The clear region in various examples may be referred to as a well-clear region, boundary, violation volume or the like.

The conflict 410 may be classified in a number of different manners based on its geometry. Examples of geometric classifications that describe conflict from the perspective of the robot 204 with respect to the moving object 404 include head-on, overtaken, overtaking, left oblique overtaking, right oblique overtaking, converging from left, converging from right.

FIGS. 6 and 7 illustrate angles that may be determined to describe the conflict, specified in the range of [−180°, 180], according to some example implementations. As shown in FIG. 6, in some examples, the plurality of angles includes a first angle ($\varphi$) at which the robot 204 observes the moving object 404, a second angle ($\psi$) at which the moving object observes the robot, and a third angle ($\theta$) between the trajectories at a crossing point 602 of the trajectories. As shown in FIG. 7, in other examples, the first angle is an angle ($\varphi_{cpa}$) at which the robot is predicted to observe the moving object 404 at the closest point of approach 702 of the moving object. More particularly, the first angle may be the angle between the robot trajectory 406 and a relative separation vector 604 between the robot and the moving object, and the second angle may be the angle between moving object trajectory 408 and the relative separation vector.

In some examples, the conflict 410 may be further characterized according to distance (separation distance) between the robot 204 and the moving object 404, at the closest point of approach of the moving object. As shown in FIG. 8, the conflict may be a first type (at times referred to as "ambiguous") when the closest point of approach 702 of the moving object 404 and the robot 204 is within a defined horizontal miss distance (HMD) threshold 802, and a second type (at times referred to as "unambiguous") when the closest point of approach 702 of the moving object 404 and the robot 204 is outside the defined HMD threshold. The defined HMD threshold may depend on the type of robot; and in one example, the defined HMD threshold may be 1,000 feet (approximately 305 meters). As also shown, in either instance, the conflict is detected when the nearby moving object is within the clear region 412 that includes the robot at the closest point of approach.

Returning to FIG. 5, the avoidance maneuver selector 506 service is configured to receive an indication of the conflict 410 from the conflict detection 504 service, determine the plurality of angles that describe the conflict, and select a maneuver such as turn left or turn right to avoid the conflict. More particularly, the avoidance maneuver selector service is configured to evaluate the plurality of angles to select the maneuver to avoid the conflict. In some examples, the avoidance maneuver selector service is configured to apply the plurality of angles to an algorithm including conditional statements by which the plurality of angles are evaluated to select the maneuver to avoid the conflict. The avoidance maneuver selector service is configured to then output an indication of the maneuver for use in at least one of guidance, navigation or control of the robot 204 to avoid the conflict.

In some examples in which the conflict is of the first type (ambiguous), the plurality of angles includes the first angle ($\varphi$) and second angle ($\psi$), and the first angle and the second angle are evaluated to select the maneuver to avoid the conflict. In some of these examples, the conditional statements include a first conditional statement, a second conditional statement, and a third conditional statement. The first angle ($\varphi$) and the second angle ($\psi$) are evaluated by the first conditional statement to determine if the trajectories cross, such as when $|\varphi|+|\psi| \leq 180°$. The second conditional statement is evaluated when the first conditional statement is evaluated to true, and the third conditional statement is evaluated when the first conditional statement is evaluated to false.

In some examples, a region centered on the robot 204 is divided into sectors, such as shown in FIG. 9 for region 900. In some of these examples, the first angle ($\varphi$) is evaluated to determine the moving object 404 is within one of the sectors. The maneuver as selected from the second conditional statement, then, is a first maneuver such as turn left when the moving object is within a first one or more non-adjacent ones of the sectors, such as sector 902. The maneuver is a second maneuver such as turn right when the moving object is within a second one or more non-adjacent ones of the sectors, such as sectors 904. And the maneuver is one of the first maneuver or the second maneuver dependent on the second angle ($\psi$) when the moving object is within a third one or more non-adjacent ones of the sectors, such as sectors 906.

In some examples, the sectors into which the region 900 is divided depend on evaluation of the first conditional statement. In some of these examples, the region divided into fewer sectors when the first conditional statement is evaluated to false, and the first angle ($\varphi$) is evaluated by the third conditional statement, relative to when the first conditional statement is evaluated to true, and the first angle is evaluated by the second conditional statement. This is shown in FIG. 9 for the region divided into sectors 910 when the first conditional statement is evaluated to true (the trajectories cross), and divided into sectors 912 that are fewer in number when the first conditional statement is evaluated to false.

In some even more particular examples for sectors 910, the first one or more non-adjacent ones of the sectors 902 includes an 80° sector that spans [120°, −160°]. In some of these examples, the second one or more non-adjacent ones of the sectors 904 includes a 90° sector that spans [0°, 90°], and a 100° sector that spans [−160°, −60°], and the third one or more non-adjacent ones of the sectors 906 includes a 60° sector that spans [−60°, 0°], and a 30° sector that spans [90°, 120°]. Similarly, in some particular examples for sectors 912, the first one or more non-adjacent ones of the sectors includes a 180° sector that spans [0°, 180°], the second one or more non-adjacent ones of the sectors includes a 160° sector that spans [−160°, 0°], and the third one or more non-adjacent ones of the sectors includes a 20° sector that spans [−180°, −160°].

In pseudocode form, in some examples, the conditional statements of the algorithm for the conflict 410 of the first type may be expressed as follows:

```
If |φ| + |ψ| ≤ 180°
    if (30° < ψ < 155°) ∧ (−60° < φ < 0°), Then "Turn Left"
    Else If (ψ < 60°) ∧ (90° < φ < 160°), Then "Turn Left"
    Else If (|φ| ≥ 160°), Then "Turn Left"
    Else "Turn Right"
Else
    If (φ ≥ 0°), Then "Turn Left"
    Else If (ψ ≥ [8 × (180° + φ) − 180°]) ∧ (ψ ≤ −20°), Then "Turn Left"
    Else If (|ψ| ≤ 20°) ∧ (φ < −160°), Then "Turn Left"
    Else "Turn Right"
```

In the pseudocode, "∧" represents a logical conjunction (a Boolean AND operation).

In some examples, the conflict is of the second type (unambiguous), the plurality of angles includes the first angle ($\varphi$) and third angle ($\theta$), and the first angle and the third angle are evaluated to determine the maneuver to avoid the conflict. In some of these examples, the conflict of the second type is detected from an estimation of the closest point of approach ($d_{cpa}$), as shown for example in FIG. 7. In some of these examples, the conditional statements include a first conditional statement by which an uncertainty ($cpa_{uncertainty}$) in the estimation is evaluated to determine if the uncertainty is less than a threshold uncertainty such as $0.25 \times d_{cpa}$, and a second conditional statement evaluated when the first conditional statement is evaluated to true.

Referring again to FIG. 9 in which the region 900 centered on the robot 204 is divided into sectors, such as sectors 914 for the conflict 410 of the second type. In some of these examples, the first angle is an angle ($\varphi_{cpa}$) at which the robot is predicted to observe the moving object 404 at the closest point of approach ($d_{cpa}$), and the first angle is evaluated by the second conditional statement to determine the moving object is within one of the sectors. In some of these examples, the maneuver is one of the first maneuver (e.g., turn left) or null dependent on the third angle ($\theta$) when the moving object is within a first one or more non-adjacent ones of the sectors 916. And the maneuver is one of a second maneuver (e.g., turn right) or null dependent on the third angle when the moving object is within a second one or more non-adjacent ones of the sectors 918. In the above, a null maneuver may refer to the case in which the maneuver is indeterminate for the second type of conflict (unambiguous), and the maneuver may instead be selected according to the first type of conflict (ambiguous).

As also shown in FIG. 9, in some particular examples, the first one or more non-adjacent ones of the sectors 916 includes a 180° sector that spans [0°, 180°], and the second one or more non-adjacent ones of the sectors 918 includes a 180° sector that spans [−180°, 0°]. In pseudocode form, in some examples, the conditional statements of the algorithm for the conflict 410 of the second type may be expressed as follows:

```
If (d_cpa > cpa_unamb) ∧ (cpa_uncertainty < 0.25 d_cpa)
    If (φ_cpa > 0°)
        If (θ ≤ 0°), Then "Turn Left"
        Else If (θ > 90°), Then "Turn Left"
        Else If [φ_cpa > (90° − θ)] ∧ [sign(φ) == sign(φ_cpa)], Then "Turn
            Left"
        Else "Null"
    Else
        If (θ ≥ 0°), Then "Right"
        Else If (θ < −90°), Then "Right"
        Else If [φ_cpa > (−90° − θ)] ∧ [sign(φ) = = sign(φ_cpa)], Then "Turn
            Right"
        Else "Null"
Else "Null"
```

Regardless of the exact manner by which the avoidance maneuver selector 506 service is configured to select a maneuver to avoid the conflict 410, the avoidance maneuver selector service may output an indication of the maneuver. The MMS 210 and in particular the mission execution subsystem 310 of the MMS may then cause the robot to execute the maneuver. This may include the MMS configured to send one or more maneuver commands to the RMS 208 to control the robot to follow the maneuver commands and thereby execute the maneuver. The mission execution subsystem of the MMS may be further configured to cause the robot to return to the current route. In this regard, the track management 502, conflict detection 504, and avoidance maneuver selector 506 services may continue as described above. And when the conflict detection service no longer detects the conflict for the robot, the mission execution subsystem may cause the robot to return to its earlier route.

Although described in the context of a nearby moving object, example implementations of the present disclosure may be equally applicable to a nearby stationary object or spatial condition such as a physical obstacle (e.g., man-made structures, terrain), weather condition, artificial threat or no-fly zone. In some of these examples, a position of the nearby stationary object or spatial condition may be accessed. A conflict between the robot and the nearby stationary object or spatial condition may be detected, and a maneuver to avoid the conflict may be selected, in a manner the same as or similar to that described in the context of a nearby moving object. Other aspects in the context of the nearby moving object described herein may also similarly be applied in the context of a nearby stationary object or spatial condition.

FIG. 10 is a flowchart illustrating various steps in a method 1000 of detecting and avoiding conflict along a current route of a robot, according to various example implementations of the present disclosure. The method includes accessing or determining trajectories of the robot and a nearby moving object forward in time from respective current positions of the robot and the nearby moving object, as shown at block 1002. The method includes detecting a conflict between the robot and the nearby moving object from a comparison of the trajectories, as shown at block 1004.

The method 1000 includes selecting a maneuver to avoid the conflict, as shown at block 1006. This includes determining a plurality of angles that describe the conflict, as shown at block 1008. The plurality of angles includes a first angle at which the robot observes the moving object, and either a second angle at which the moving object observes the robot, or a third angle between the trajectories at a crossing point of the trajectories. Selecting the maneuver also includes evaluating the plurality of angles to select the maneuver to avoid the conflict, as shown at block 1010. And the method includes outputting an indication of the maneuver for use in at least one of guidance, navigation or control of the robot to avoid the conflict, as shown at block 1012.

In some examples, the conflict is of a first type in which a closest point of approach of the moving object and the robot is within a defined horizontal miss distance (HMD) threshold. In some of these examples, the plurality of angles includes the second angle. In some of these examples, the first angle and the second angle are evaluated to select the maneuver to avoid the conflict.

In some examples in which the conflict is of the first type, evaluating the plurality of angles includes applying the first angle and the second angle to an algorithm including conditional statements by which the first angle and the second angle are evaluated.

In some further examples, the conditional statements include a first conditional statement by which the first angle and the second angle are evaluated to determine if the trajectories cross. a second conditional statement evaluated when the first conditional statement is evaluated to true, and a third conditional statement evaluated when the first conditional statement is evaluated to false.

In some yet further examples, a region centered on the robot is divided into sectors. In some of these examples, the first angle is evaluated to determine the moving object is within one of the sectors. In some of these examples, the maneuver as selected from the second conditional statement at block 1006 is a first maneuver when the moving object is within a first one or more non-adjacent ones of the sectors, a second maneuver when the moving object is within a second one or more non-adjacent ones of the sectors, and one of the first maneuver or the second maneuver dependent on the second angle when the moving object is within a third one or more non-adjacent ones of the sectors.

In some examples, the sectors into which the region is divided depend on evaluation of the first conditional statement. In some of these examples, the region divided into fewer sectors when the first conditional statement is evaluated to false, and the first angle is evaluated by the third conditional statement, relative to when the first conditional statement is evaluated to true, and the first angle is evaluated by the second conditional statement.

In some examples, in a range of [−180°. 180°], the first one or more non-adjacent ones of the sectors includes an 80° sector that spans [120°, −160°], the second one or more non-adjacent ones of the sectors includes a 90° sector that spans [0°, 90°], and a 100° sector that spans [−160°, −60°], and the third one or more non-adjacent ones of the sectors includes a 60° sector that spans [−60°, 0°], and a 30° sector that spans [90°, 120°].

In some examples, in a range of [−180°. 180°], the first one or more non-adjacent ones of the sectors includes a 180° sector that spans [0°, 180°], the second one or more non-adjacent ones of the sectors includes a 160° sector that spans [−160°, 0°], and the third one or more non-adjacent ones of the sectors includes a 20° sector that spans [−180°, −160°].

In some examples, the conflict is of a second type in which a closest point of approach of the moving object and the robot is outside a defined horizontal miss distance (HMD) threshold. In some of these examples, the plurality of angles includes the third angle. In some of these examples, the first angle and the third angle are evaluated to determine the maneuver to avoid the conflict.

In some examples in which the conflict is of the second type, evaluating the plurality of angles includes applying the first angle and the third angle to an algorithm including conditional statements by which the first angle and the third angle are evaluated.

In some further examples, the conflict of the second type is detected at block 1004 from an estimation of the closest point of approach. wherein the conditional statements include a first conditional statement by which an uncertainty in the estimation is evaluated to determine if the uncertainty is less than a threshold uncertainty, and a second conditional statement evaluated when the first conditional statement is evaluated to true.

In some yet further examples, a region centered on the robot is divided into sectors. In some of these examples, the first angle is an angle at which the robot is predicted to observe the moving object at the closest point of approach, and the first angle is evaluated by the second conditional statement to determine the moving object is within one of the sectors. In some of these examples, the maneuver as selected at block 1006 from the second conditional statement is one of a first maneuver or null dependent on the third angle when the moving object is within a first one or more non-adjacent ones of the sectors, and one of a second maneuver or null dependent on the third angle when the moving object is within a second one or more non-adjacent ones of the sectors.

In some examples, in a range of [−180°. 180°], the first one or more non-adjacent ones of the sectors includes a 180° sector that spans [0°, 180°], and the second one or more non-adjacent ones of the sectors includes a 180° sector that spans [−180°].

According to example implementations of the present disclosure, the MMS 210 and its subsystems including the interface subsystem 302, situational awareness subsystem 304, mission planning subsystem 306, mission coordination subsystem 308 and mission execution subsystem 310 may be implemented by various means. Means for implementing the MMS and its subsystems may include hardware, alone or under direction of one or more computer programs from a computer-readable storage medium. In some examples, one or more apparatuses may be configured to function as or otherwise implement the MMS and its subsystems shown and described herein. In examples involving more than one apparatus, the respective apparatuses may be connected to or otherwise in communication with one another in a number of different manners, such as directly or indirectly via a wired or wireless network or the like.

FIG. 11 illustrates an apparatus 1100 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 1102 (e.g., processor unit) connected to a memory 1104 (e.g., storage device).

The processing circuitry 1102 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 1104 (of the same or another apparatus).

The processing circuitry 1102 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 1104 is generally any piece of computer hardware that is capable of storing information such as, for example, data, computer programs (e.g., computer-readable program code 1106) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1104, the processing circuitry 1102 may also be connected to one or more interfaces for displaying, transmitting and/or receiving information. The interfaces may include a communications interface 1108 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1110 and/or one or more user input interfaces 1112 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 1100 may include a processing circuitry 1102 and a computer-readable storage medium or memory 1104 coupled to the processing circuitry, where the processing circuitry is configured to execute computer-readable program code 1106 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. An apparatus for detecting and avoiding conflict along a current route of a robot, the apparatus comprising: a memory configured to store computer-readable program code; and processing circuitry configured to access the memory, and execute the computer-readable program code to cause the apparatus to at least: access or determining trajectories of the robot and a nearby moving object forward in time from respective current positions of the robot and the nearby moving object; detect a conflict between the robot and the nearby moving object from a comparison of the trajectories; select a maneuver to avoid the conflict, including: determine a plurality of angles that describe the conflict, the plurality of angles including a first angle at which the robot observes the moving object, and either a second angle at which the moving object observes the robot, or a third angle between the trajectories at a crossing point of the trajectories; and evaluate the plurality of angles to select the maneuver to avoid the conflict; and output an indication of the maneuver for use in at least one of guidance, navigation or control of the robot to avoid the conflict.

Clause 2. The apparatus of clause 1, wherein the conflict is of a first type in which a closest point of approach of the moving object and the robot is within a defined horizontal miss distance (HMD) threshold, and the plurality of angles includes the second angle, and wherein the apparatus is caused to evaluate the first angle and the second angle to select the maneuver to avoid the conflict.

Clause 3. The apparatus of clause 1, wherein the conflict is of a first type in which a closest point of approach of the moving object and the robot is within a defined horizontal miss distance (HMD) threshold, and wherein the apparatus caused to evaluate the plurality of angles includes the apparatus caused to apply the first angle and the second angle to an algorithm including conditional statements by which the first angle and the second angle are evaluated.

Clause 4. The apparatus of clause 3, wherein the conditional statements include a first conditional statement by which the first angle and the second angle are evaluated to determine if the trajectories cross, a second conditional statement evaluated when the first conditional statement is evaluated to true, and a third conditional statement evaluated when the first conditional statement is evaluated to false.

Clause 5. The apparatus of clause 4, wherein a region centered on the robot is divided into sectors, and the first angle is evaluated to determine the moving object is within one of the sectors, and wherein the maneuver as selected from the second conditional statement is a first maneuver when the moving object is within a first one or more non-adjacent ones of the sectors, a second maneuver when the moving object is within a second one or more non-adjacent ones of the sectors, and one of the first maneuver or the second maneuver dependent on the second angle when the moving object is within a third one or more non-adjacent ones of the sectors.

Clause 6. The apparatus of clause 5, wherein the sectors into which the region is divided depend on evaluation of the first conditional statement, the region divided into fewer sectors when the first conditional statement is evaluated to false, and the first angle is evaluated by the third conditional statement, relative to when the first conditional statement is evaluated to true, and the first angle is evaluated by the second conditional statement.

Clause 7. The apparatus of clause 5 or clause 6, wherein in a range of [−180°, 180°], the first one or more non-adjacent ones of the sectors includes an 80° sector that spans [120°, −160°], the second one or more non-adjacent ones of the sectors includes a 90° sector that spans [0°, 90°], and a 100° sector that spans [−160°, −60°], and the third one or more non-adjacent ones of the sectors includes a 60° sector that spans [−60°, 0°], and a 30° sector that spans [90°, 120°].

Clause 8. The apparatus of any of clauses 5 to 7, wherein in a range of [−180°, 180°], the first one or more non-adjacent ones of the sectors includes a 180° sector that spans [0°, 180°], the second one or more non-adjacent ones of the sectors includes a 160° sector that spans [−160°, 0°], and the third one or more non-adjacent ones of the sectors includes a 20° sector that spans [−180°, −160°].

Clause 9. The apparatus of any of clauses 1 to 8, wherein the conflict is of a second type in which a closest point of approach of the moving object and the robot is outside a defined horizontal miss distance (HMD) threshold, and the plurality of angles includes the third angle, and wherein the apparatus is caused to evaluate the first angle and the third angle to determine the maneuver to avoid the conflict.

Clause 10. The apparatus of any of clauses 1 to 9, wherein the conflict is of a second type in which a closest point of approach of the moving object and the robot is outside a defined horizontal miss distance (HMD) threshold, and wherein the apparatus caused to evaluate the plurality of angles includes the apparatus caused to apply the first angle and the third angle to an algorithm including conditional statements by which the first angle and the third angle are evaluated.

Clause 11. The apparatus of clause 10, wherein the conflict of the second type is detected from an estimation of the closest point of approach, wherein the conditional statements include a first conditional statement by which an uncertainty in the estimation is evaluated to determine if the uncertainty is less than a threshold uncertainty, and a second conditional statement evaluated when the first conditional statement is evaluated to true.

Clause 12. The apparatus of clause 11, wherein a region centered on the robot is divided into sectors, the first angle is an angle at which the robot is predicted to observe the moving object at the closest point of approach, and the first angle is evaluated by the second conditional statement to determine the moving object is within one of the sectors, and wherein the maneuver as selected from the second conditional statement is one of a first maneuver or null dependent on the third angle when the moving object is within a first one or more non-adjacent ones of the sectors, and one of a second maneuver or null dependent on the third angle when the moving object is within a second one or more non-adjacent ones of the sectors.

Clause 13. The apparatus of clause 12, wherein in a range of [−180°, 180°], the first one or more non-adjacent ones of the sectors includes a 180° sector that spans [0°, 180°], and the second one or more non-adjacent ones of the sectors includes a 180° sector that spans [−180°, 0°].

Clause 14. A method of detecting and avoiding conflict along a current route of a robot, the method comprising: accessing or determining trajectories of the robot and a nearby moving object forward in time from respective current positions of the robot and the nearby moving object; detecting a conflict between the robot and the nearby moving object from a comparison of the trajectories; selecting a maneuver to avoid the conflict, including: determining a plurality of angles that describe the conflict, the plurality of angles including a first angle at which the robot observes the moving object, and either a second angle at which the moving object observes the robot, or a third angle between the trajectories at a crossing point of the trajectories; and evaluating the plurality of angles to select the maneuver to avoid the conflict; and outputting an indication of the maneuver for use in at least one of guidance, navigation or control of the robot to avoid the conflict.

Clause 15. The method of clause 14, wherein the conflict is of a first type in which a closest point of approach of the moving object and the robot is within a defined horizontal miss distance (HMD) threshold, and the plurality of angles includes the second angle and wherein the first angle and the second angle are evaluated to select the maneuver to avoid the conflict.

Clause 16. The method of clause 14, wherein the conflict is of a first type in which a closest point of approach of the moving object and the robot is within a defined horizontal miss distance (HMD) threshold, and wherein evaluating the plurality of angles includes applying the first angle and the second angle to an algorithm including conditional statements by which the first angle and the second angle are evaluated.

Clause 17. The method of clause 16, wherein the conditional statements include a first conditional statement by which the first angle and the second angle are evaluated to determine if the trajectories cross, a second conditional statement evaluated when the first conditional statement is evaluated to true, and a third conditional statement evaluated when the first conditional statement is evaluated to false.

Clause 18. The method of clause 17, wherein a region centered on the robot is divided into sectors, and the first angle is evaluated to determine the moving object is within one of the sectors, and wherein the maneuver as selected from the second conditional statement is a first maneuver when the moving object is within a first one or more non-adjacent ones of the sectors, a second maneuver when the moving object is within a second one or more non-adjacent ones of the sectors, and one of the first maneuver or the second maneuver dependent on the second angle when the moving object is within a third one or more non-adjacent ones of the sectors.

Clause 19. The method of clause 18, wherein the sectors into which the region is divided depend on evaluation of the first conditional statement, the region divided into fewer sectors when the first conditional statement is evaluated to false, and the first angle is evaluated by the third conditional statement, relative to when the first conditional statement is evaluated to true, and the first angle is evaluated by the second conditional statement.

Clause 20. The method of clause 18 or clause 19, wherein in a range of [−180°, 180°], the first one or more non-adjacent ones of the sectors includes an 80√ sector that spans [120°, −160°], the second one or more non-adjacent ones of the sectors includes a 90° sector that spans [0°, 90°], and a 100° sector that spans [−160°, −60°], and the third one or more non-adjacent ones of the sectors includes a 60° sector that spans [−60°, 0°], and a 30° sector that spans [90°, 120°].

Clause 21. The method of any of clauses 18 to 20, wherein in a range of [−180°, 180°], the first one or more non-adjacent ones of the sectors includes a 180° sector that spans [0°, 180°], the second one or more non-adjacent ones of the sectors includes a 160° sector that spans [−160°, 0°], and the third one or more non-adjacent ones of the sectors includes a 20° sector that spans [−180°, −160°].

Clause 22. The method of any of clauses 14 to 21, wherein the conflict is of a second type in which a closest point of approach of the moving object and the robot is outside a defined horizontal miss distance (HMD) threshold, and the plurality of angles includes the third angle, and wherein the first angle and the third angle are evaluated to determine the maneuver to avoid the conflict.

Clause 23. The method of any of clauses 14 to 22, wherein the conflict is of a second type in which a closest point of approach of the moving object and the robot is outside a defined horizontal miss distance (HMD) threshold, and wherein evaluating the plurality of angles includes applying the first angle and the third angle to an algorithm including conditional statements by which the first angle and the third angle are evaluated.

Clause 24. The method of clause 16, wherein the conflict of the second type is detected from an estimation of the closest point of approach, wherein the conditional statements include a first conditional statement by which an uncertainty in the estimation is evaluated to determine if the uncertainty is less than a threshold uncertainty, and a second conditional statement evaluated when the first conditional statement is evaluated to true.

Clause 25. The method of clause 17, wherein a region centered on the robot is divided into sectors, the first angle is an angle at which the robot is predicted to observe the moving object at the closest point of approach, and the first angle is evaluated by the second conditional statement to determine the moving object is within one of the sectors, and wherein the maneuver as selected from the second conditional statement is one of a first maneuver or null dependent on the third angle when the moving object is within a first one or more non-adjacent ones of the sectors, and one of a second maneuver or null dependent on the third angle when the moving object is within a second one or more non-adjacent ones of the sectors.

Clause 26. The method of clause 25, wherein in a range of [−180°, 180°], the first one or more non-adjacent ones of the sectors includes a 180° sector that spans [0°, 180°], and the second one or more non-adjacent ones of the sectors includes a 180° sector that spans [−180°, 0°].

Clause 27. A computer-readable storage medium for detecting and avoiding conflict along a current route of a robot, the computer-readable storage medium being non-transitory and having computer-readable program code stored therein that, in response to execution by processing circuitry, causes an apparatus to at least: access or determining trajectories of the robot and a nearby moving object forward in time from respective current positions of the robot and the nearby moving object; detect a conflict between the robot and the nearby moving object from a comparison of the trajectories; select a maneuver to avoid the conflict, including: determine a plurality of angles that describe the conflict, the plurality of angles including a first angle at which the robot observes the moving object, and either a second angle at which the moving object observes the robot, or a third angle between the trajectories at a crossing point of the trajectories; and evaluate the plurality of angles to select the maneuver to avoid the conflict; and output an indication of the maneuver for use in at least one of guidance, navigation or control of the robot to avoid the conflict.

Clause 28. The computer-readable storage medium of clause 27, wherein the conflict is of a first type in which a closest point of approach of the moving object and the robot is within a defined horizontal miss distance (MMD) threshold, and the plurality of angles includes the second angle, and wherein the apparatus is caused to evaluate the first angle and the second angle to select the maneuver to avoid the conflict.

Clause 29. The computer-readable storage medium of clause 28, wherein the conditional statements include a first conditional statement by which the first angle and the second angle are evaluated to determine if the trajectories cross, a second conditional statement evaluated when the first conditional statement is evaluated to true, and a third conditional statement evaluated when the first conditional statement is evaluated to false.

Clause 30. The computer-readable storage medium of clause 29, wherein a region centered on the robot is divided into sectors, and the first angle is evaluated to determine the moving object is within one of the sectors, and wherein the maneuver as selected from the second conditional statement is a first maneuver when the moving object is within a first one or more non-adjacent ones of the sectors, a second maneuver when the moving object is within a second one or more non-adjacent ones of the sectors, and one of the first maneuver or the second maneuver dependent on the second angle when the moving object is within a third one or more non-adjacent ones of the sectors.

Clause 31. The computer-readable storage medium of clause 30, wherein the sectors into which the region is divided depend on evaluation of the first conditional statement, the region divided into fewer sectors when the first conditional statement is evaluated to false, and the first angle is evaluated by the third conditional statement, relative to when the first conditional statement is evaluated to true, and the first angle is evaluated by the second conditional statement.

Clause 32. The computer-readable storage medium of clause 30 or clause 31, wherein in a range of [−180°, 180°], the first one or more non-adjacent ones of the sectors includes an 80° sector that spans [120°, −160°], the second one or more non-adjacent ones of the sectors includes a 90° sector that spans [0°, 90°], and a 100° sector that spans [−160°, −60°], and the third one or more non-adjacent ones of the sectors includes a 60° sector that spans [−60°, 0°], and a 30° sector that spans [90°, 120°].

Clause 33. The computer-readable storage medium of any of clauses 30 to 32, wherein in a range of [−180°, 180°], the first one or more non-adjacent ones of the sectors includes a 180° sector that spans [0°, 180°], the second one or more non-adjacent ones of the sectors includes a 160° sector that spans [−160°, 0°], and the third one or more non-adjacent ones of the sectors includes a 20° sector that spans [−180°, −160°].

Clause 34. The computer-readable storage medium of any of clauses 27 to 33, wherein the conflict is of a second type in which a closest point of approach of the moving object and the robot is outside a defined horizontal miss distance (HMD) threshold, and the plurality of angles includes the third angle, and wherein the apparatus is caused to evaluate the first angle and the third angle to determine the maneuver to avoid the conflict.

Clause 35. The computer-readable storage medium of clause 34, wherein the conflict of the second type is detected from an estimation of the closest point of approach, wherein the conditional statements include a first conditional statement by which an uncertainty in the estimation is evaluated to determine if the uncertainty is less than a threshold uncertainty, and a second conditional statement evaluated when the first conditional statement is evaluated to true.

Clause 36. The computer-readable storage medium of clause 35, wherein a region centered on the robot is divided into sectors, the first angle is an angle at which the robot is predicted to observe the moving object at the closest point of approach, and the first angle is evaluated by the second conditional statement to determine the moving object is within one of the sectors, and wherein the maneuver as selected from the second conditional statement is one of a first maneuver or null dependent on the third angle when the moving object is within a first one or more non-adjacent ones of the sectors, and one of a second maneuver or null dependent on the third angle when the moving object is within a second one or more non-adjacent ones of the sectors.

Clause 37. The computer-readable storage medium of clause 36, wherein in a range of [−180°, 180°], the first one or more non-adjacent ones of the sectors includes a 180° sector that spans [0°, 180°], and the second one or more non-adjacent ones of the sectors includes a 180° sector that spans [−180°, 0°].

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for detecting and avoiding conflict along a current route of a robot, the apparatus comprising:
   a memory configured to store computer-readable program code; and
   processing circuitry configured to access the memory, and execute the computer-readable program code to cause the apparatus to at least:
   access or determining trajectories of the robot and a nearby moving object forward in time from respective current positions of the robot and the nearby moving object;
   detect a conflict between the robot and the nearby moving object from a comparison of the trajectories;
   select a maneuver to avoid the conflict, including:
      determine a plurality of angles that describe the conflict, the plurality of angles including a first angle at which the robot observes the moving object, and either a second angle at which the moving object observes the robot, or a third angle between the trajectories at a crossing point of the trajectories; and evaluate the plurality of angles to select the maneuver to avoid the conflict include applying an algorithm that includes a first conditional statement by which the first angle and the second angle are evaluated to determine if the trajectories cross, a second conditional statement evaluated when the first conditional statement is evaluated to true, and a third conditional statement evaluated when the first conditional statement is evaluated to false; and output an indication of the maneuver for use in at least one of guidance, navigation or control of the robot to avoid the conflict;

a region centered on the robot is divided into sectors, and the first angle is evaluated to determine if the moving object is within one of the sectors, and wherein the maneuver as selected from the second conditional statement is a first maneuver when the moving object is within a first one or more non-adjacent ones of the sectors, a second maneuver when the moving object is within a second one or more non-adjacent ones of the sectors, and one of the first maneuver or the second maneuver dependent on the second angle when the moving object is within a third one or more non-adjacent ones of the sectors.

2. The apparatus of claim 1, wherein the conflict is of a first type in which a closest point of approach of the moving object and the robot is within a defined horizontal miss distance (HMD) threshold, and the plurality of angles includes the second angle, and wherein the apparatus is configured to evaluate the first angle and the second angle to select the maneuver to avoid the conflict.

3. The apparatus of claim 1, wherein the conflict is of a first type in which a closest point of approach of the moving object and the robot is within a defined horizontal miss distance (HMD) threshold.

4. The apparatus of claim 1, wherein the sectors into which the region is divided depend on evaluation of the first conditional statement, the region divided into fewer sectors when the first conditional statement is evaluated to false, and the first angleis evaluated by the third conditional statement, relative to when the first conditional statement is evaluated to true, and the first angle is evaluated by the second conditional statement.

5. The apparatus of claim 1, wherein in a range of [−180°, 180°], the first one or more non-adjacent ones of the sectors includes an 80° sector that spans [120°, −160°], the second one or more non-adjacent ones of the sectors includes a 90° sector that spans [0°, 90°], and a 100° sector that spans [−160°, −60°], and the third one or more non-adjacent ones of the sectors incudes a 60° sector that spans [−60°, 0°], and a 30° sector that spans [90°, 120°].

6. The apparatus of claim 1, wherein in a range of [−180°, 180°], the first one or more non-adjacent ones of the sectors includes a 180° sector that spans [0°, 180°], the second one or more non-adjacent ones of the sectors includes a 160° sector that spans [−160°, 0°], and the third one or more non-adjacent ones of the sectors includes a 20° sector that spans [−180°, −160°].

7. The apparatus of claim 1, wherein the conflict is of a second type in which a closest point of approach of the moving object and the robot is outside a defined horizontal miss distance (HMD) threshold, and the plurality of angles includes the third angle, and wherein the apparatus is configured to evaluate the first angle and the third angle to determine the maneuver to avoid the conflict.

8. The apparatus of claim 1, wherein the conflict is of a second type in which a closest point of approach of the moving object and the robot is outside a defined horizontal miss distance (HMD) threshold, wherein the conflict of the second type is detected from an estimation of the closest point of approach, and wherein evaluate the plurality of angles to select the maneuver to avoid the conflict includes applying the first angle and the third angle to the algorithm that includes the first conditional statement by which an uncertainty in the estimation is evaluated to determine if the uncertainty is less than a threshold uncertainty, and the second conditional statement evaluated when the first conditional statement is evaluated to true.

9. The apparatus of claim 8, wherein the first angle is an angle at which the robot is predicted to observe the moving object at the closest point of approach, and the first angle is evaluated by the second conditional statement to determine if the moving object is within one of the sectors, and wherein the maneuver as selected from the second conditional statement is one of the first maneuver or null dependent on the third angle when the moving object is within the first one or more non-adjacent ones of the sectors, and one of the second maneuver or null dependent on the third angle when the moving object is within the second one or more non-adjacent ones of the sectors.

10. The apparatus of claim 9, wherein in a range of [−180°, 180°], the first one or more non-adjacent ones of the sectors includes a 180° sector that spans [0°, 180°], and the second one or more non-adjacent ones of the sectors includes a 180° sector that spans [−180°, 0°].

11. A method of detecting and avoiding conflict along a current route of a robot, the method comprising:

accessing or determining trajectories of the robot and a nearby moving object forward in time from respective current positions of the robot and the nearby moving object;

detecting a conflict between the robot and the nearby moving object from a comparison of the trajectories;

selecting a maneuver to avoid the conflict, including:
determining a plurality of angles that describe the conflict, the plurality of angles including a first angle at which the robot observes the moving object, and either a second angle at which the moving object observes the robot, or a third angle between the trajectories at a crossing point of the trajectories; and evaluating the plurality of angles to select the maneuver to avoid the conflict includes applying the first angle and the second angle to an algorithm that includes a first conditional statement by which the first angle and the second angle are evaluated to determine if the trajectories cross, a second conditional statement evaluated when the first conditional statement is evaluated to true, and a third conditional statement evaluated when the first conditional statement is evaluated to false; and outputting an indication of the maneuver for use in at least one of guidance, navigation or control of the robot to avoid the conflict;

wherein a region centered on the robot is divided into sectors, and the first angle is evaluated to determine if the moving object is within one of the sectors, and wherein the maneuver as selected from the second conditional statement is one of a first maneuver or null dependent on the third angle when the moving object is within a first one or more non-adjacent ones of the sectors, and one of a second maneuver or null dependent on the third angle when the moving object is within a second one or more non-adjacent ones of the sectors.

12. The method of claim 11, wherein the conflict is of a first type in which a closest point of approach of the moving object and the robot is within a defined horizontal miss distance (HMD) threshold, and the plurality of angles includes the second angle, and
wherein the first angle and the second angle are evaluated to select the maneuver to avoid the conflict.

13. The method of claim 11, wherein the conflict is of a first type in which a closest point of approach of the moving object and the robot is within a defined horizontal miss distance (HMD) threshold.

14. The method of claim 13,
wherein the maneuver as selected from the second conditional statement is the first maneuver when the moving object is within the first one or more non-adjacent ones of the sectors, the second maneuver when the moving object is within the second one or more non-adjacent ones of the sectors, and one of the first maneuver or the second maneuver dependent on the second angle when the moving object is within a third one or more non-adjacent ones of the sectors.

15. The method of claim 14, wherein the sectors into which the region is divided depend on evaluation of the first conditional statement, the region divided into fewer sectors when the first conditional statement is evaluated to false, and the first angle is evaluated by the third conditional statement, relative to when the first conditional statement is evaluated to true, and the first angle is evaluated by the second conditional statement.

16. The method of claim 14, wherein in a range of [−180°, 180°], the first one or more non-adjacent ones of the sectors includes an 80° sector that spans [120°, −160°], the second one or more non-adjacent ones of the sectors includes a 90° sector that spans [0°, 90°], and a 100° sector that spans [−160°, −60°], and the third one or more non-adjacent ones of the sectors includes a 60° sector that spans [−60°, 0°], and a 30° sector that spans [90°, 120°].

17. The method of claim 14, wherein in a range of [−180°, 180°], the first one or more non-adjacent ones of the sectors includes a 180° sector that spans [0°, 180°], the second one or more non-adjacent ones of the sectors includes a 160° sector that spans [−160°, 0°], and the third one or more non-adjacent ones of the sectors includes a 20° sector that spans [−180°, −160°].

18. The method of claim 11, wherein the conflict is of a second type in which a closest point of approach of the moving object and the robot is outside a defined horizontal miss distance (HMD) threshold, and the plurality of angles includes the third angle, and
wherein the first angle and the third angle are evaluated to determine the maneuver to avoid the conflict.

19. The method of claim 11, wherein the conflict is of a second type in which a closest point of approach of the moving object and the robot is outside a defined horizontal miss distance (HMD) threshold, wherein the conflict of the second type is detected from an estimation of the closest point of approach, and
wherein evaluating the plurality of angles to select the maneuver to avoid the conflict includes applying the first angle and the third angle to the algorithm that includes the first conditional statement by which an uncertainty in the estimation is evaluated to determine if the uncertainty is less than a threshold uncertainty, and the second conditional statement evaluated when the first conditional statement is evaluated to true.

20. The method of claim 19, wherein the first angle is an angle at which the robot is predicted to observe the moving object at the closest point of approach, and the first angle is evaluated by the second conditional statement to determine if the moving object is within one of the sectors.

21. The method of claim 20, wherein in a range of [−180°, 180°], the first one or more non-adjacent ones of the sectors includes a 180° sector that spans [0°, 180°], and the second one or more non-adjacent ones of the sectors includes a 180° sector that spans [−180°, 0°].

22. The apparatus of claim 1, wherein:
the sectors into which the region is divided include a first set of sectors and a second set of sectors centered on the robot;
the first set of sectors are disposed closer to the robot than the second set of sectors; and
the first set of sectors include more sectors than the second set of sectors.

23. The apparatus of claim 1, wherein:
the sectors into which the region is divided include a first set of sectors, a second set of sectors, and a third set of sectors centered on the robot;
the first set of sectors are disposed closer to the robot than the second set of sectors;
the second set of sectors are disposed closer to the robot that the third set of sectors such that the second set of sectors are disposed between the first set of sectors and the second set of sectors; and
the first set of sectors include more sectors than the second set of sectors, and the second set of sectors include more sectors than the third set of sectors.

24. The apparatus of claim 1, wherein:
the sectors into which the region is divided include a first set of sectors and a second set of sectors centered on the robot;
the first set of sectors are disposed closer to the robot than the second set of sectors; and
each of the first set of sectors are less than 180°.

25. An apparatus for detecting and avoiding conflict along a current route of a robot, the apparatus comprising:
a memory configured to store computer-readable program code; and
processing circuitry configured to access the memory, and execute the computer-readable program code to cause the apparatus to at least:
access or determining trajectories of the robot and a nearby moving object forward in time from respective current positions of the robot and the nearby moving object;
detect a conflict between the robot and the nearby moving object from a comparison of the trajectories;
select a maneuver to avoid the conflict, including:
determine a plurality of angles that describe the conflict, the plurality of angles including a first angle at which the robot observes the moving object, and either a second angle at which the moving object observes the robot, or a third angle between the trajectories at a crossing point of the trajectories;
evaluate the plurality of angles to select the maneuver to avoid the conflict;

determine if the conflict is a first type in which a closest point of approach of the moving object and the robot is within a defined horizontal miss distance (HMD) threshold; and determine if the conflict is of a second type in which the closest point of approach of the moving object and the robot is outside the defined HMD threshold;

output an indication of the maneuver for use in at least one of guidance, navigation or control of the robot to avoid the conflict;

a region centered on the robot is divided into sectors that include a first set of sectors and a second set of sectors centered on the robot;

the first set of sectors are disposed closer to the robot than the second set of sectors; and the first set of sectors include more sectors than the second set of sectors.

26. The apparatus of claim 25, wherein the first set of sectors and the second set of sectors completely surround the robot.

* * * * *

UNITED STATES PATENT AND TRADEMARK OFFICE
CERTIFICATE OF CORRECTION

PATENT NO. : 11,948,468 B2
APPLICATION NO. : 17/305284
DATED : April 2, 2024
INVENTOR(S) : Martin Kearney-Fischer It is certified that error appears in the above-identified patent and that said Letters Patent is hereby corrected as shown below:

On the Title Page

Item (71) The Applicant: "Aurora Flight Sciences Corporation" should read --Aurora Flight Sciences Corporation, a subsidiary of The Boeing Company--.

Item (73) The Assignee: "Aurora Flight Sciences Corporation" should read --Aurora Flight Sciences Corporation, a subsidiary of The Boeing Company--.

In the Claims

Claim 4, Column 21, Line 44: "angleis" should read --angle is--.

Claim 5, Column 21, Line 54: "incudes" should read --includes--.

Claim 21, Column 24, Line 13: "oneor" should read --one or--.

Signed and Sealed this
Third Day of December, 2024

Katherine Kelly Vidal
*Director of the United States Patent and Trademark Office*